Figure 1:
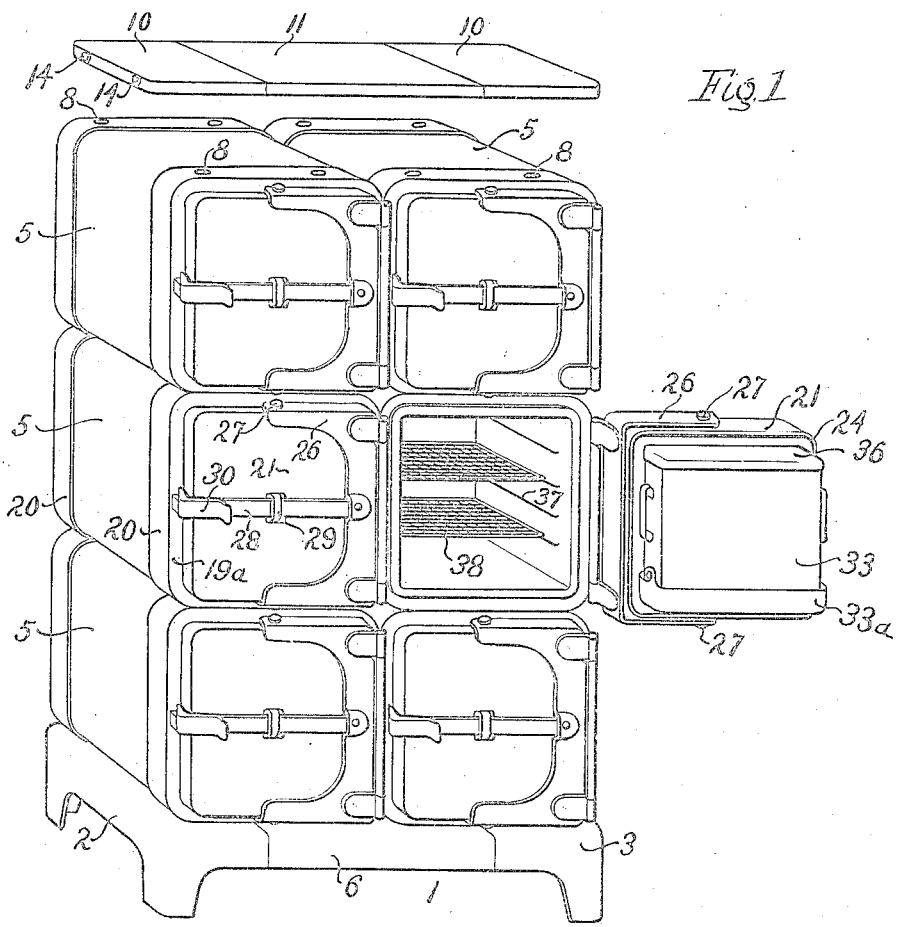

UNITED STATES PATENT OFFICE.

JOHN L. FITZGERALD, OF EMPORIA, KANSAS.

AUXILIARY BACKREST FOR AUTOMOBILES.

1,377,823.   Specification of Letters Patent.   Patented May 10, 1921.

Application filed August 4, 1920. Serial No. 401,156.

*To all whom it may concern:*

Be it known that I, JOHN L. FITZGERALD, a citizen of the United States, residing at Emporia, in the county of Lyon and State of Kansas, have invented certain new and useful Improvements in Auxiliary Backrests for Automobiles, of which the following is a specification, reference being had to the accompanying drawings.

This invention relates to removable back rests for automobiles.

An important object of the invention is to provide a device of this character which may be readily attached to and detached from the seat of an automobile.

A further object of the invention is to provide a device of this character which automatically provides a circulation of air to the back of the person seated in an automobile, thereby preventing the unpleasant dampness occurring as the result of perspiration because of the contact of the back with the ordinary cushion of the automobile seat during warm weather.

These and other objects I accomplish by my invention, one form of which is illustrated in the accompanying drawings, wherein like reference characters designate like parts throughout and wherein:

Figure 1 is a side elevation showing my device applied to the seat back of an automobile; and Fig. 2 is a front elevation of my device detached.

Referring now more particularly to the drawings, the numeral 10 designates the back of an automobile seat and the numeral 11 the support for the seat proper.

The numeral 13 indicates an auxiliary back support or cushion having extending upwardly from the rear face thereof a strap 14 adapted to be passed about the upper end of the seat back 10 and adjustably secured upon the rear side thereof by means of detachable fasteners 15 which may take the form of snap fasteners as illustrated, if so desired. Extending downwardly from the rear face of the auxiliary cushion 13 is a strap 16 having its lower end broadened as at 17 adapted to be placed on the seat support 11 intermediate the seat support and cushion 12 and to be held in position by the weight of the person occupying the seat upon the cushion and by the weight of the cushion itself. By the adjustable securing means the cushion may be vertically adjusted to suit the user.

The auxiliary cushion 13 has the back, top, and bottom thereof of unitary construction and is provided with a front face formed of a net work of cross members 18 affording therebetween air circulation spaces 19. The sides of the device are open and the front face thereof is held in an extended position by means of a plurality of springs 20 of uniform compressibility and a plurality of other springs 21 of greater strength than the springs 20 and of a lesser length than these springs. These springs 21 are preferably carried by the rear face of the auxiliary cushion and only come into play when sufficient pressure is applied to the face of the cushion to overcome the action of the springs 20 when the springs 21 act as a check to prevent complete collapsing of the cushion.

It will be obvious that in driving an automobile where the driver is constantly exerting force in applying brakes, releasing clutches and to shifting his position upon the seat considerable movement is applied to the outer face of the auxiliary cushion accordingly causing the cushion to act somewhat on the principle of a bellows pumping the air out as the cushion is compressed and drawing the air in as they are released and thereby causing a constant circulation which has access to the driver's back through the openings 19.

It will be obvious that my construction is, because of its ease in application, cheapness to manufacture, and efficiency in operation particularly adapted for use and it will likewise be obvious that the construction indicated is capable of considerable change without departing from the spirit of my invention. I, accordingly, do not limit myself to such specific structure but may make any such changes except as limited by the scope of the subjoined claims.

Having now described my invention, what I claim is:

1. The combination with a vehicle seat embodying the usual seat support, seat, and seat back, of an auxiliary cushion adapted to be placed against the front face of the seat back, an attaching member secured to the upper end of said cushion and adapted to extend over the top of and be adjustably secured to the rear face of said seat